United States Patent
Roberts et al.

(10) Patent No.: US 6,705,916 B2
(45) Date of Patent: *Mar. 16, 2004

(54) SYSTEM AND METHOD FOR ROUTING A CALL TO A CALLED PARTY'S LANDLINE OR WIRELESS COMMUNICATION UNIT

(75) Inventors: Richard N. Roberts, Elgin, IL (US); Todd August Bartels, New Berlin, WI (US); Terrence J. McCarthy, Carol Stream, IL (US); Wayne Robert Heinmiller, Elgin, IL (US); Rodney T Brand, Lisle, IL (US); Leslie Bernard Moore, Elgin, IL (US); Carlos H Donoso, Bartlett, IL (US); Kara Elisia Ford, Fishers, IN (US)

(73) Assignee: SBC Properties L.P., Reno, NV (US)

( * ) Notice: Subject to any disclaimer, the term of this patent is extended or adjusted under 35 U.S.C. 154(b) by 141 days.

This patent is subject to a terminal disclaimer.

(21) Appl. No.: 09/815,965

(22) Filed: Mar. 23, 2001

(65) Prior Publication Data

US 2003/0207689 A1 Nov. 6, 2003

Related U.S. Application Data

(63) Continuation of application No. 09/079,061, filed on May 14, 1998, now Pat. No. 6,208,854.

(51) Int. Cl.[7] .................. H04Q 7/20; H04M 3/42
(52) U.S. Cl. ............ 445/445; 455/414.1; 455/435.1; 455/461; 379/88.22; 379/201.1
(58) Field of Search ................ 455/412, 413, 455/414, 417, 418, 422, 432, 433, 435, 436, 445, 461, 563, 564, 569, 412.1, 412.2, 414.1–414.4, 422.1, 432.1, 432.2, 435.1–435.2; 379/201, 207, 210, 211, 212, 88.15, 88.22, 88.23, 88.24, 88.25, 88.26, 201.1, 207.01–207.09, 207.12–207.16, 210.01–210.03, 211.01–211.07

(56) References Cited

U.S. PATENT DOCUMENTS

| | | | |
|---|---|---|---|
| 5,206,901 | A | 4/1993 | Harlow et al. |
| 5,325,419 | A | 6/1994 | Connolly et al. |
| 5,329,578 | A | 7/1994 | Brennan et al. |
| 5,353,331 | A | 10/1994 | Emery et al. |
| 5,408,528 | A | 4/1995 | Carlson et al. |
| 5,454,032 | A | 9/1995 | Pinard et al. |
| 5,457,736 | A | 10/1995 | Cain et al. |
| 5,469,496 | A | 11/1995 | Emery et al. |
| 5,504,804 | A | 4/1996 | Widmark et al. |

(List continued on next page.)

OTHER PUBLICATIONS

Harry Newton, "Newton's Telecom Dictionary," pp. 54–55, 1994.

Primary Examiner—Nay Maung
Assistant Examiner—Edan Orgad
(74) Attorney, Agent, or Firm—Brinks Hofer Gilson & Lione

(57) ABSTRACT

A method and system are provided for routing a call to a called party's landline or wireless communication unit based on the availability of the wireless communication unit. A call placed to a called party's landline communication unit is routed to the called party's wireless communication unit if the wireless communication unit is determined available, otherwise, the call is routed to the called party's landline communication unit. Unlike past attempts to facilitate communication with a called party having wireless and landline communication units, these preferred embodiments operate automatically (without called party intervention) before a call is terminated at the landline communication unit and are responsive to the availability of the called party's wireless communication unit. Further, there preferred embodiments do not rely on complex, predetermined hunting sequences or expensive adjunct customer premises equipment.

20 Claims, 6 Drawing Sheets

U.S. PATENT DOCUMENTS

| | | |
|---|---|---|
| 5,506,887 A | 4/1996 | Emery et al. |
| 5,526,403 A | 6/1996 | Tam |
| 5,537,467 A | 7/1996 | Cheng et al. |
| 5,541,976 A | 7/1996 | Ghisler |
| 5,579,375 A | 11/1996 | Ginter |
| 5,579,379 A | 11/1996 | D'Amico et al. |
| 5,583,564 A | 12/1996 | Rao et al. |
| 5,600,704 A | 2/1997 | Ahlberg et al. |
| 5,610,969 A | 3/1997 | McHenry et al. |
| 5,610,972 A | 3/1997 | Emery et al. |
| 5,654,958 A | 8/1997 | Natarajan |
| 5,664,005 A | 9/1997 | Emery et al. |
| 5,673,308 A | 9/1997 | Akhavan |
| 5,715,296 A | 2/1998 | Schornack et al. |
| 5,729,599 A | 3/1998 | Plomondon et al. |
| 5,901,359 A | 5/1999 | Malmstrom |
| 5,903,845 A | 5/1999 | Buhrmann et al. |
| 5,963,864 A | 10/1999 | O'Neil et al. |
| 6,073,029 A | 6/2000 | Smith et al. |

SYSTEM AND METHOD FOR ROUTING A CALL TO A CALLED PARTY'S LANDLINE OR WIRELESS COMMUNICATION UNIT

This application is a continuation of Ser. No. 09/079,061 field May 14, 1998 now Pat. No. 6,208,854.

TECHNICAL FIELD

The present invention relates generally to call processing in telecommunication networks and specifically to a system and method for routing a call to a called party's landline or wireless communication unit.

BACKGROUND

Many people have a wireless communication unit, such as a cellular phone, in addition to a landline communication unit, such as a home telephone. While having a home phone and a cellular phone allows a person to place calls both at and away from home, two phones with unique phone numbers can make reaching the person difficult. For example, a person carrying an active cellular phone will miss a call placed to his home phone.

Several methods have been suggested to facilitate communication with users having wireless and landline communication units. In one method, a user forwards calls from his home phone to his cellular phone by manually entering the cellular phone number into a call forwarding service. After entry of the cellular phone number, all calls to the user's home phone are forwarded from the home phone to the user's cellular phone, even if the cellular phone is inactive. In another method, if a call placed to a user's home phone is not answered after several rings, the call is transferred to the user's cellular phone. Because the call is transferred typically after four or five rings, some calling parties, believing that the call will not be answered, hang up before the call is transferred. Other methods rely on complex, pre-determined hunting sequences or expensive adjunct customer premises equipment.

There is a need, therefore, for an improved system and method for routing a call to a called party's landline or wireless communication unit that will overcome the disadvantages described above.

DETAILED DESCRIPTION OF THE PRESENTLY PREFERRED EMBODIMENTS

Figure 1:
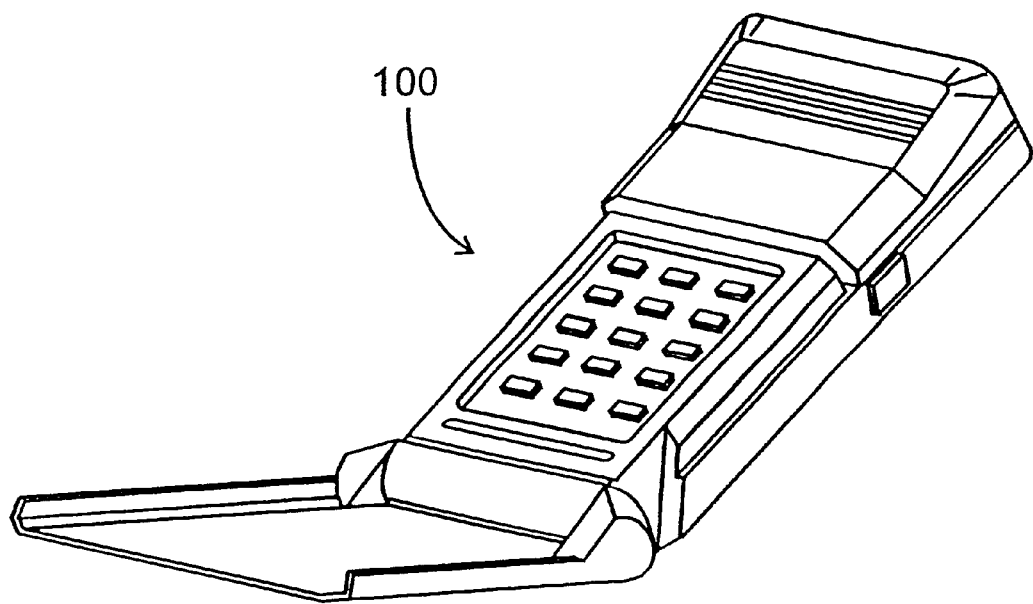
FIG. 1 is an illustration of a wireless communication unit of a preferred embodiment.

By way of introduction, the preferred embodiments described below include a method and system for routing a call to a called party's landline or wireless communication unit based on the availability of the wireless communication unit. In one embodiment, a call placed to a called party's landline communication unit is routed to the called party's wireless communication unit, such as a cellular phone 100 (FIG. 1), if the wireless communication unit is available. Otherwise, the call is routed to the called party's landline communication unit. Unlike past attempts to facilitate communication with a called party having wireless and landline communication units, these preferred embodiments operate automatically (without called-party intervention) before a call is terminated at the landline communication unit and are responsive to the availability of the called party's wireless communication unit. Further, there preferred embodiments do not rely on complex, pre-determined hunting sequences or expensive adjunct customer premises equipment.

Figure 2:
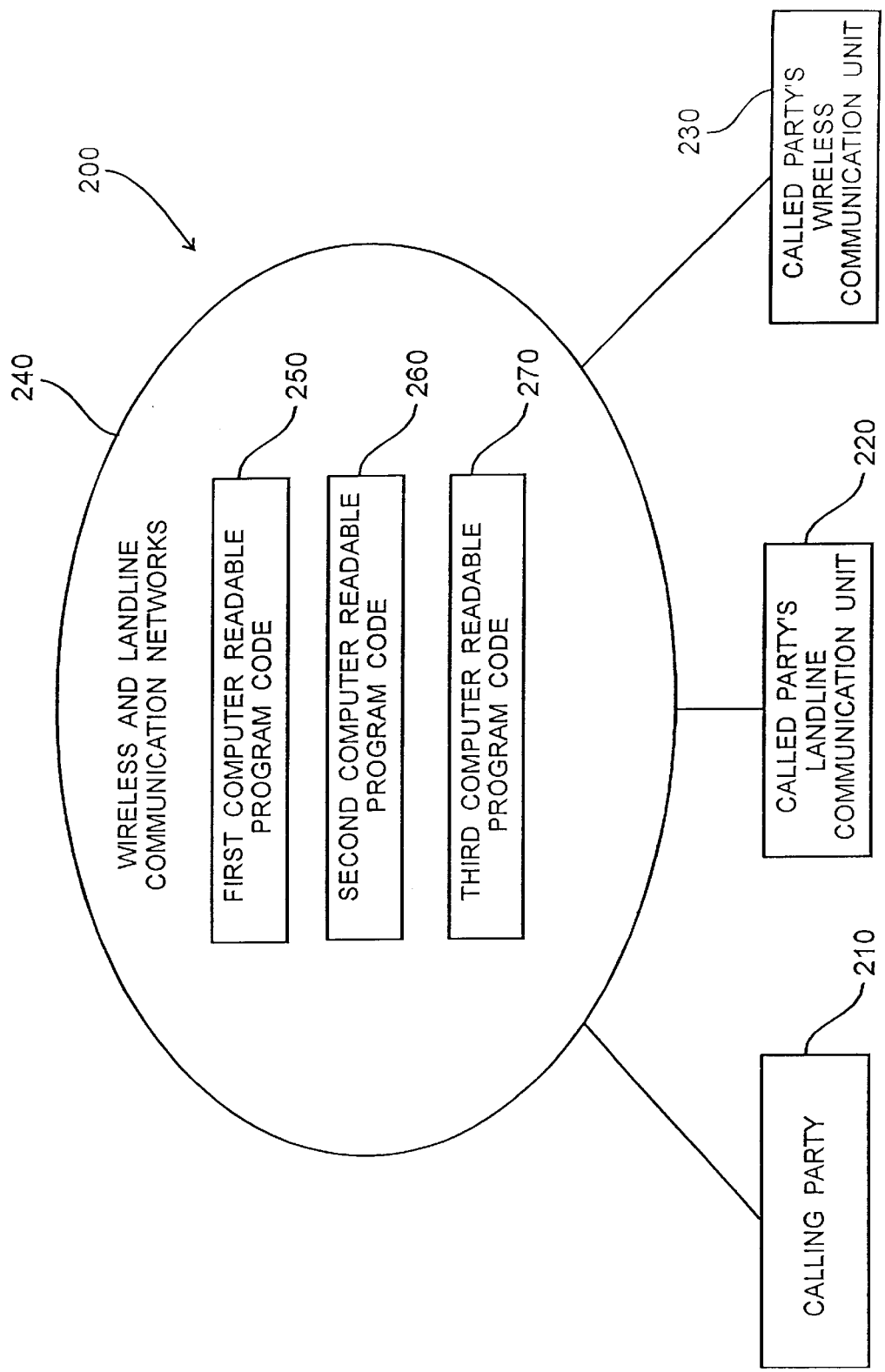
FIG. 2 is a block diagram of a telecommunication system of a preferred embodiment.

Turning again to the drawings, FIG. 2 is a block diagram of a telecommunication system 200 of a preferred embodiment. As shown in FIG. 2, a calling party 210 is coupled with a called party's landline communication unit 220 and wireless communication unit 230 through wireless and landline communication networks 240. As used herein, the term "coupled with" means directly coupled with or indirectly coupled with through one or more components. The wireless and landline communication networks 240 comprise computer usable medium having first, second, and third computer readable program codes 250, 260, 270 embodied therein. It is important to note that while the program codes 250, 260, 270 have been shown as three separate components, their functionality can be combined and/or distributed. It is also important to note that "media" is intended to broadly cover any suitable media, analog or digital, now in use or developed in the future.

Figure 3:
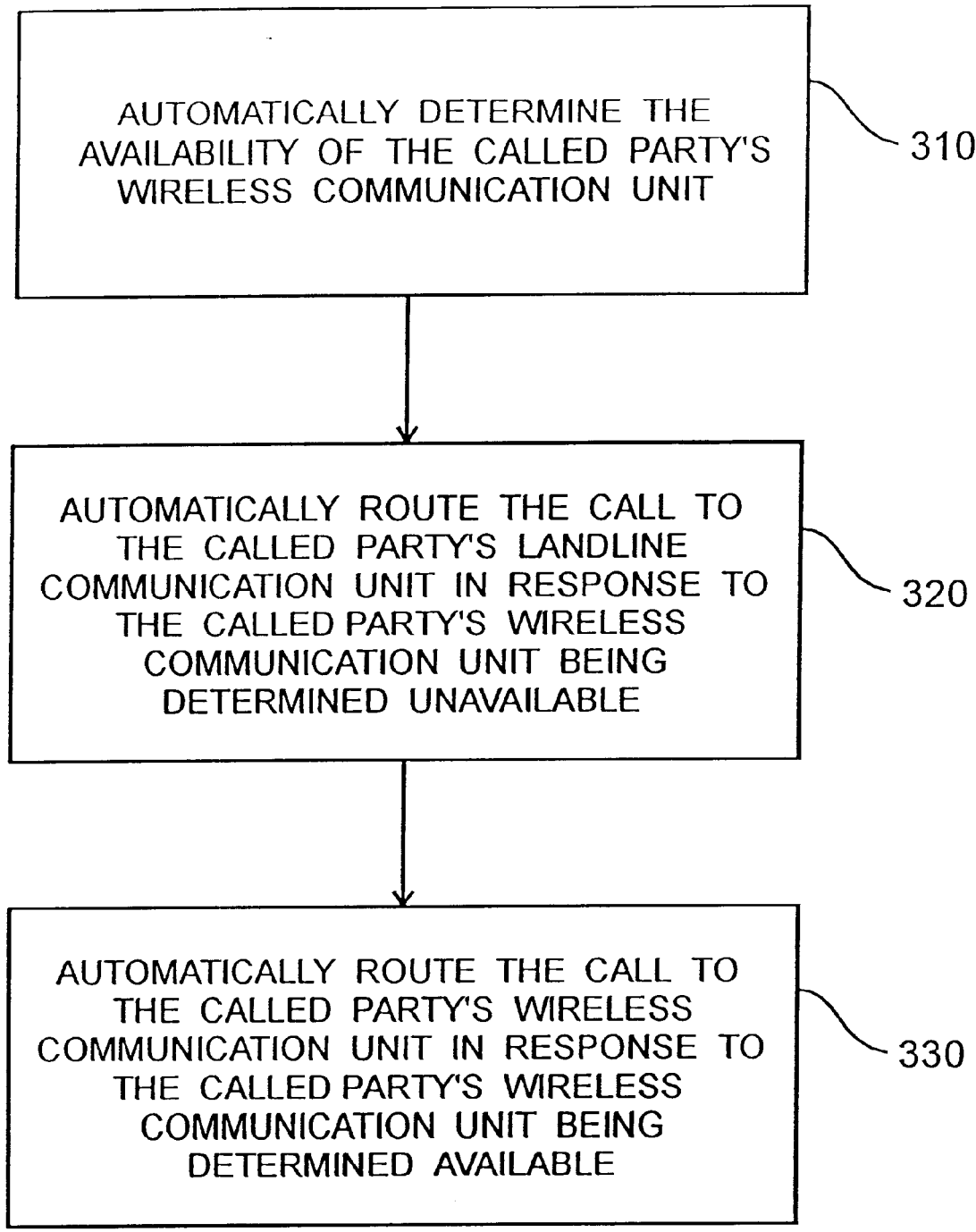
FIG. 3 is a flow chart of a method of a preferred embodiment for automatically routing a call to a called party's landline or wireless communication unit.

The telecommunication system 200 of FIG. 2 can be used in a method for automatically routing a call to a called party's landline or wireless communication unit, as shown in the flow chart of FIG. 3. When the calling party 210 places a call to the called party, the first computer readable program code 250 automatically determines the availability of the called party's wireless communication unit 230 (step 310). In response to the called party's wireless communication unit 230 being determined unavailable, the second computer readable program code 260 automatically routes the call to the called party's landline communication unit 220 (step 320). In response to the called party's wireless communication unit 230 being determined available, the third computer readable program code 270 automatically routes the call to the called party's wireless communication unit 230 (step 330).

Figure 4:
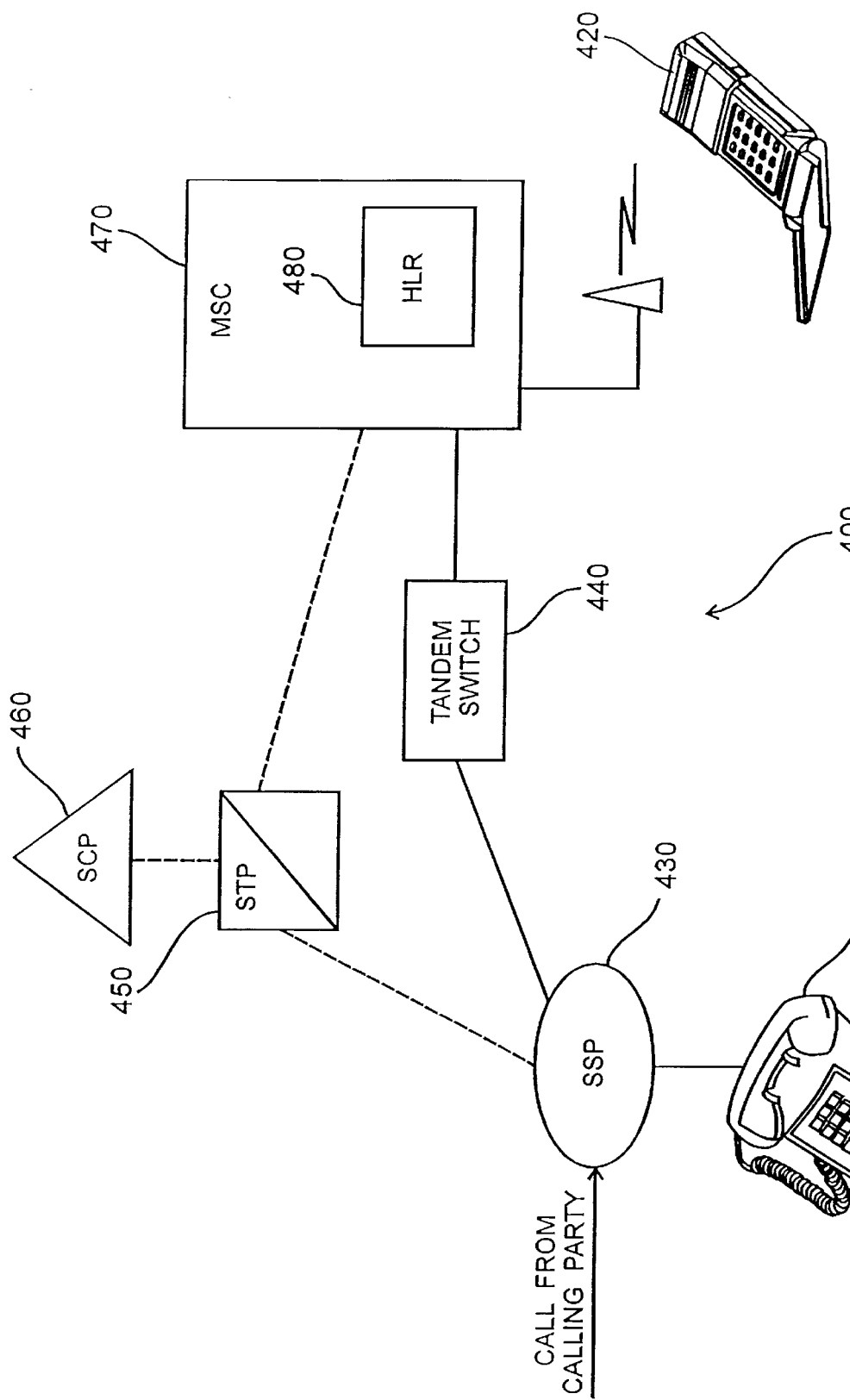
FIG. 4 is a block diagram of one preferred embodiment of the telecommunication system of FIG. 2.

FIG. 4 is a block diagram of one preferred embodiment 400 of the telecommunication system 200 of FIG. 2. This preferred system 400 comprises a landline communication unit 410 coupled with a wireless communication unit 420 through a signal switching point (SSP) 430, a tandem switch 440, a signal transfer point (STP) 450, a service control point (SCP) 460, a mobile switching center (MSC) 470, and a home location register (HLR) 480. This system 400 embodies an intelligent bridge between components used in wireless and landline networks. The MSC 470 and the HLR 480 are components used in a wireless network. The MSC 470 handles switching and routing to the wireless communication unit 420, and the HLR 480 is a database that stores information about the location of the wireless communication unit 420.

The other components of the system 400 communicate voice and data traffic and network signaling protocols that control switching of the voice and data traffic The SSP 430 is a central office equipped with Advanced Intelligent Network (AIN) software, which enables the SSP 430 to suspend call processing and launch a query to the SCP 460 via the STP 450. The SCP 460 handles queries sent from the SSP 430 by communicating with HLR 480, although any database that contains the information described below can be used. Preferably, communication between the SCP 460 and the HLR 480 is carried out through a Signaling System 7 (SS7) network using IS-41 Transaction Capabilities Applications Protocol (TCAP) Rev. B protocol. The SSP 430 also communicates voice and data traffic to the MSC 470 via the tandem switch 440.

In this embodiment, the SSP 430 is associated with the called party's landline communication unit 410 and receives a call from a calling party. Because the SSP 430 is associated with the called party, it is referred to as a terminating SSP. It should be understood that an SSP associated with the calling party (an originating SSP) can be modified to perform the functions described below. It is important to note that the SSP 430 can transfer voice and data traffic directly without the use of the tandem switch 440 and can directly transfer network signaling protocols to the SCP 460 without the use of the STP 450. Also, a central office not equipped with an SSP can be provided with software to send messages to the SCP 460 in an AIN-query format. Preferably, the SCP 460 utilizes a service order interface to create an automated message account (AMA) billing record to charge for calls that are routed using the method described below.

Figure 5:
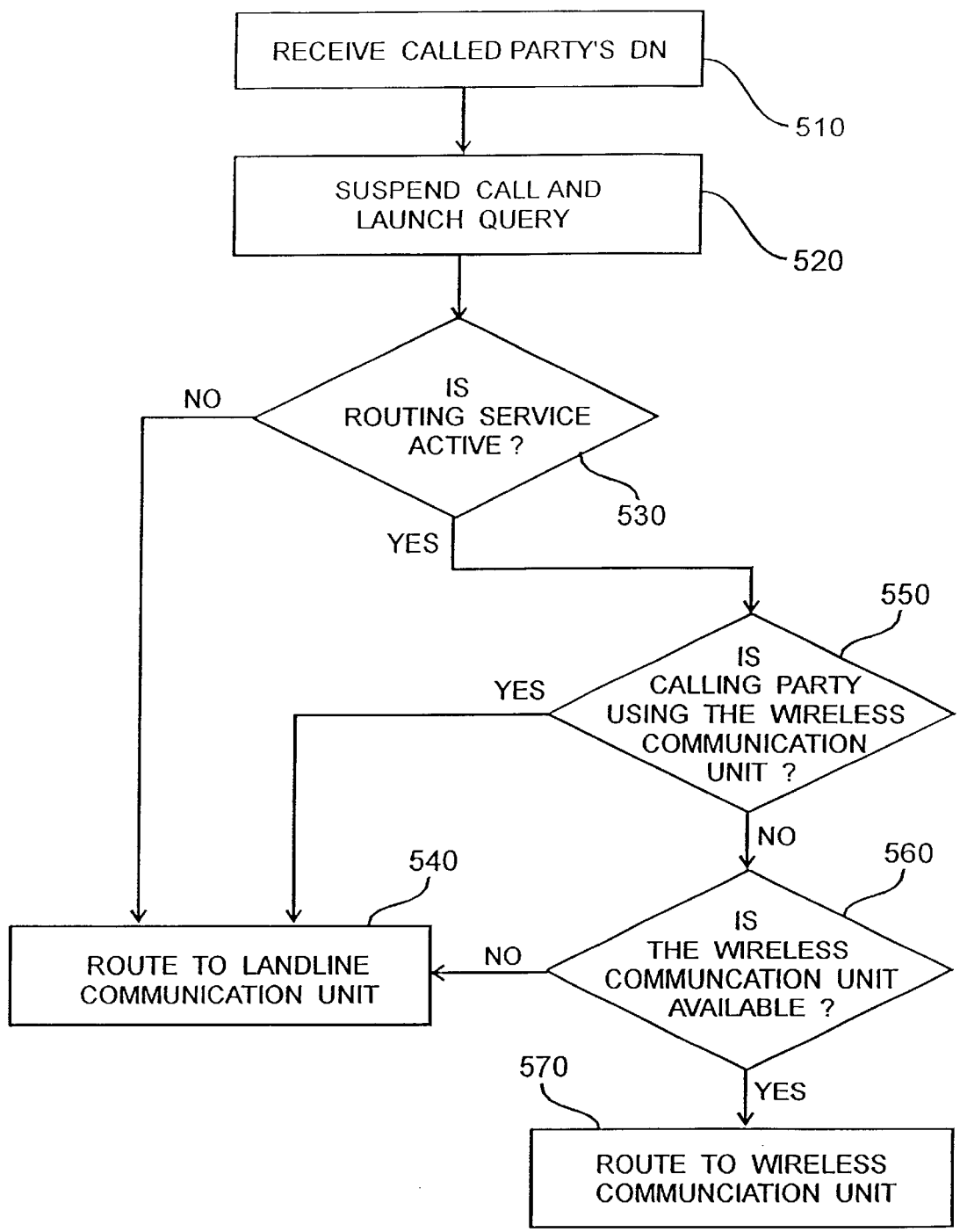
FIG. 5 is a flow chart of a method of a preferred embodiment for automatically routing a call to a called party's landline or wireless communication unit using the telecommunication system of FIG. 4.

FIG. 5 is a flow chart of a method of a preferred embodiment for automatically routing a call to a called party's landline or wireless communication unit 410, 420 using the preferred system 400 of FIG. 4. First, the SSP 430 receives the called party's destination number (DN) from the calling party (step 510). In this preferred embodiment, the called party's DN is the DN associated with the called party's landline communication unit 410. A terminating attempt trigger (TAT) at the SSP 430 recognizes the called party's DN, and the SSP 430 suspends the call and launches a terminating attempt query to the SCP 460 (step 520). Preferably this query follows the form shown in Appendix A.

Next, the SCP 460 determines whether the wireless/landline routing service is active (step 530). If the wireless/landline routing service is deactive, the SCP 460 responds to the query from the SSP 430 with a message authorizing termination to the called party's landline communication unit 410 (preferably in the form shown in Appendix B), and the SSP 430 routes the call to the landline communication unit 410 (step 540). If the wireless/landline call routing service is active, the SCP 460 determines whether the calling party is using the wireless communication unit 420 (step 550). This determination can be made, for example, by analyzing the DN of the calling party identification parameter in the AIN query. If the calling party is using the wireless communication unit 420, it is preferred that the call be routed to the called party's landline communication unit 410 (step 540) to avoid automatically routing the call back to the wireless communication unit 420 itself (i.e., to prevent circular routing).

Figure 6:
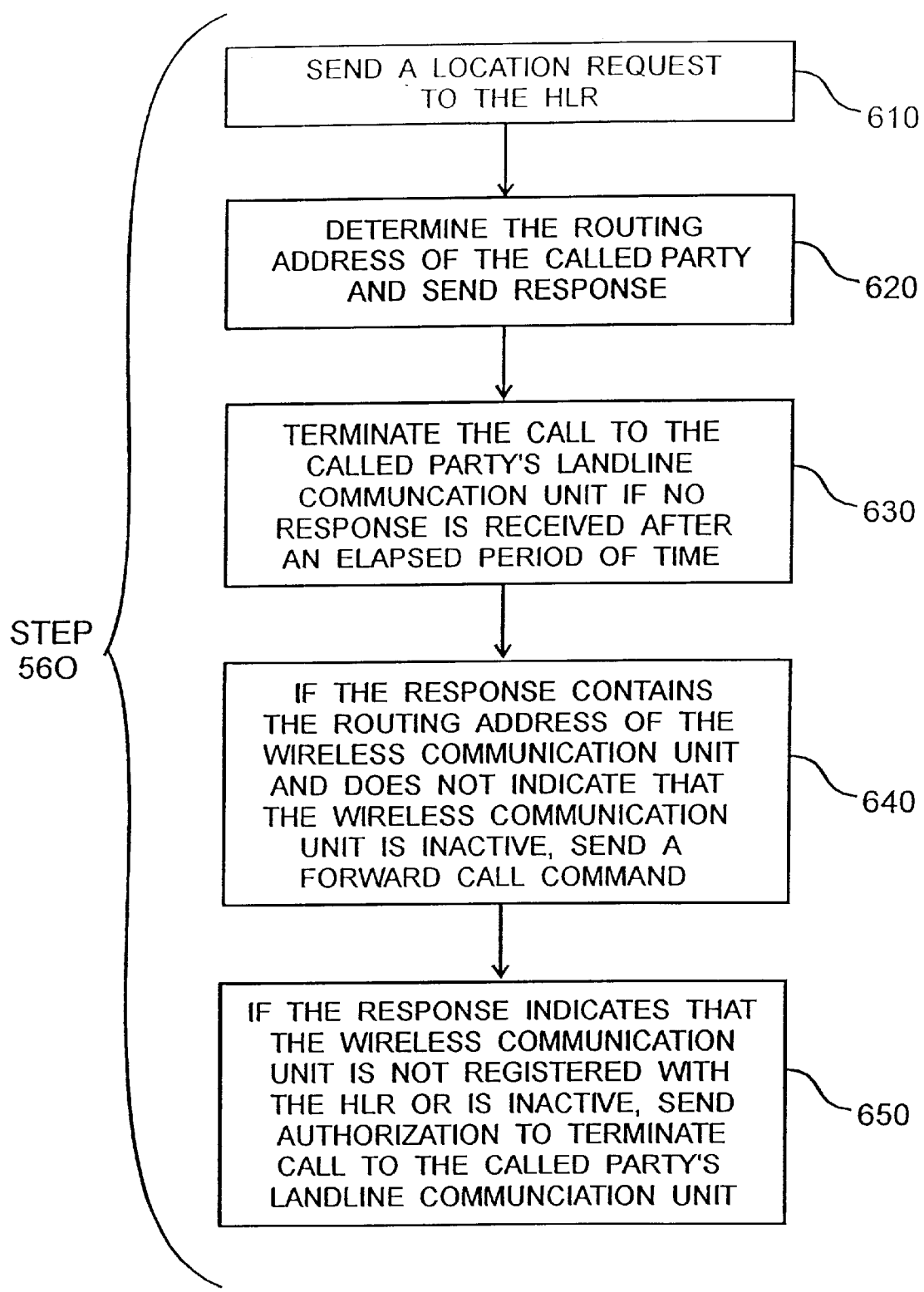
FIG. 6 is a flow chart of a method of a preferred embodiment for determining whether a called party's wireless communication unit is available.

If the calling party is not using the wireless communication unit 420 (or if the SCP 460 cannot make the determination), the SCP 460 determines whether the called party's wireless communication unit 420 is available (step 560). The preferred execution of this step is shown in the flow chart of FIG. 6. First, SCP 460 sends a location request to the HLR 480 of the MSC 470 (step 610). It is preferred that the location request follow the form shown in Appendix C. Upon receiving the request, the HLR 480 determines the routing address of the wireless communication unit 420 and sends a response containing the routing address, if available, to the SCP 460 (step 620). If no response is received by the SCP 460 after an elapsed period of time, the SCP 460 preferably authorizes the SSP 430 to terminate the call to the called party's landline communication unit 410 (step 630). If the response contains the routing address of the wireless communication unit 420 and does not indicate that the wireless communication unit 420 is inactive (e.g., if the "access denied" field is populated by any value except "2" (inactive)), the SCP 460 sends a forward call command to the SSP 430 (step 640), and the call is routed through the MSC 470 to the wireless communication unit 420 (step 570). A preferred response format from the HLR 480 is shown in Appendix D, and a preferred forward call command format is shown in Appendix E.

If the response indicates that the wireless communication unit 420 is not registered with the HLR 480 or is inactive (see the preferred response in Appendix F) the SCP 460 sends the SSP 430 a message authorizing termination to the called party's landline communication unit 410, preferably in the form shown in Appendix G (step 650). The SSP 430 then routes the call to the landline communication unit 410 (step 540).

It is possible that a call routed to an active wireless communication unit 420 will go unanswered. Such a call can be handled by the logic in the MSC 470 (e.g., termination of the call, transfer to voice mail, call forward to another number, etc.). To prevent circular routing of calls, it is preferred that the calling party DN be changed to the DN of the wireless communication unit 420 for calls routed to the wireless communication unit 420. In this way, if, for example, the MSC 470 is programmed to forward unanswered calls to the landline communication unit 410, the automatic landline/routing feature described above will not re-route the call to the wireless communication unit 420 (see step 550 above).

It is also possible that a call routed to an active wireless communication unit 420 will terminate on a busy line. As described above, the MSC 470 can transfer such a call to the voice-mail system associated with the wireless communication unit 420. A called party, however, may not be aware of the need to check that voice-mail system. To avoid this problem, a unified voice-mail system can be used to handle calls from both the wireless communication unit 420 and the landline communication unit 410. In this way, a user can check the voice-mail system associated with the landline communication unit 410 and receive messages left by callers who were routed to the wireless communication unit 420.

In the above-described preferred embodiment, the availability of the wireless communication unit 420 was based on whether the wireless communication unit 420 was active. In an alternative embodiment, availability is additionally based on whether the wireless communication unit 420 is busy. In this embodiment, the SCP 460 authorizes the SSP 430 to route the call to the wireless communication unit 420 only if the unit 420 is both active and not busy.

While the number of the called party's landline communication unit 410 was used in the above-described preferred embodiments to trigger a query, a number not associated with either the called party's landline or wireless communication unit can be used to trigger the query. Also, a query can be triggered when a calling party dials the number of the called party's wireless communication unit 420. As one example of this alternative embodiment, a call to the placed wireless communication unit 420 can be automatically forwarded by the MSC 470 to the SSP 430, which launches a query as described above. Of course, if a call is placed to the non-triggering number, the call will be directly connected to that communication unit. For example, in the embodiment illustrated in FIG. 5, a call to the wireless communication unit 420 will be directly connected to that unit 420.

In another alternative embodiment, if a call is routed to the communication unit that is not associated with the number called by the calling party, an indication can be generated by that communication unit. For example, if a calling party dials a number for the called party's landline communication unit and if the call is routed to the called party's active wireless communication unit, a distinctive ring, such as a multiple ring, can be generated by the wireless communication unit. In contrast, a call directly terminated to the wireless communication unit can have a single ring. In this way, a called party can monitor the ring pattern of a communication unit to determine whether the incoming call is a direct or routed call. Of course, other kinds of indications, such as a visual indication, can be generated.

As mentioned in the discussion above with reference to FIG. 5, it is possible to deactivate the wireless/landline call routing service. One way of engaging or disengaging the service is through an interactive voice response (IVR) unit. A called party can disengage the service if he does not want to be disturbed by or incur the expense of a routed call. One way in which to deactivate the wireless/landline call routing service is to engaging an unconditional call forwarding feature.

As another alternative, the SCP 460 can instruct the SSP 430 to play a message to the calling party while waiting for a response from the HLR 480. This message can alert the calling party that the call is being processed, providing the advantage of alerting the calling party that the call is being processed despite a delay, which can occur, for example, if the called party is roaming between MSCs.

For simplicity, the term "landline communication unit" is intended to broadly cover any communication unit that receives calls from a calling party through a physical connection from a main switch point, such as a central office. Landline communication units include, but are not limited to, home or office telephones, fax machines, and modems. Also for simplicity, the term "wireless communication unit" is intended to broadly cover any communication unit that receives calls from a calling party through a wireless, over-the-air connection. Wireless communication units preferably include, but are not limited to, cellular phones, mobile phone, paging devices, and modems adapted to receive wireless transmissions, although personal communication service (PCS) devices can also be used. Wireless communication units can use any wireless communication technology including, but not limited to, analog with enhanced registration, time division multiple access (TDMA), code division multiple access (CDMA), and global system multiple (GSM) technology, as well as radio, infrared, and satellite transmissions.

It is intended that the foregoing detailed description be understood as an illustration of selected forms that the invention can take and not as a definition of the invention. It is only the following claims, including all equivalents, that are intended to define the scope of this invention.

Appendix A

AIN Query: Termination Attempt
   Called Party ID—Called Number
   data—LATA ID
   Calling Party ID—Calling Number (if available)
   Original Called Party ID (if available)
   Redirected Party ID (if available)
   Redirection Information (if available)

Appendix B

AIN Response: Auth_Term
   CallingPartyID=Calling Number (if available)
   CalledPartyID=Landline Number (as dialed)

Appendix C

IS-41 INVOKE: LOCREQ
   Digits(dialed)
   MSCID
   SystemMyTypeCode
   Billing ID Appendix D IS-41 RETURN RESULT: locreq
   MSCID
   MIN
   MSD
   Digits—Routing Address Appendix E AIN Response: Forward Call
   CallingPartyID=Calling Number (if available)
   CallingPartyID=Wireless Number
   Primary Carrier
   AMAAlernatBillingNumber=Wireless Number
AMAslpID=value from wireless service provider Appendix F IS-41 RETURN RESULT: locreq
   MSCID
   MIN
   MSD
   AccessDeniedReason=2 (inactive)

Appendix G

AIN Response: Auth_Term
What is claimed is:

1. A method for routing a call to a called party's landline or wireless communication unit, the method comprising:

(a) receiving, from a calling party, a destination number assigned to the called party's wireless communication unit;

(b) automatically determining an availability of the called party's wireless communication unit;

(c) automatically routing the call to the called party's landline communication unit in response to the called party's wireless communication unit being determined unavailable in (b); and (d) automatically routing the call to the called party's wireless communication unit in response to the called party's wireless communication unit being determined available in (b).

2. The method of claim 1, wherein (b) comprises (b1) sending a location request to a home location register; and (b2) analyzing a response to the location request.

3. The method of claim 1, wherein the called party's wireless communication unit is unavailable if inactive and is available if active.

4. The method of claim 1, wherein the called party's wireless communication unit is unavailable if busy and is available if not busy.

5. The method of claim 1 further comprising playing a message to a calling party before the call is automatically routed, the message alerting the calling party that the call is being processed.

6. The method of claim 1 further comprising using an interactive voice response system to disable performance of (b)–(d).

7. The method of claim 1 further comprising using a unified voice-mail system operative to receive messages for both the landline communication unit and the wireless communication unit.

8. A method for routing a call to a called party's landline or wireless communication unit; the method comprising:

(a) receiving, from a calling party, a destination number different from destination numbers assigned to the called party's landline and wireless communication units;

(b) automatically determining an availability of the called party's wireless communication unit;

(c) automatically routing the call to the called party's landline communication unit in response to the called party's wireless communication unit being determined unavailable in (b); and (d) automatically routing the call to the called party's wireless communication unit in response to the called party's wireless communication unit being determined available in (b).

9. The method of claim 8 further comprising automatically routing the call to the called party's landline communication unit in response to a calling party using the called party's wireless communication unit.

10. The method of claim 8, wherein (b) comprises (b1) sending a location request to a home location register; and (b2) analyzing a response to the location request.

11. The method of claim 8, wherein the called party's wireless communication unit is unavailable if inactive and is available if active.

12. The method of claim 8, wherein the called party's wireless communication unit is unavailable if busy and is available if not busy.

13. The method of claim 8 further comprising providing the called party's wireless communication unit with an indication that the call is automatically being routed to the called party's wireless communication unit and is not a direct call to the wireless communication unit.

14. The method of claim 8 further comprising providing the called party's wireless communication unit with a distinctive ring indicating that the call is not a direct call to the wireless communication unit in response to automatically routing the call to the called party's wireless communication unit.

15. The method of claim 8 further comprising playing a message to a calling party before the call is automatically routed, the message alerting the calling party that the call is being processed.

16. The method of claim 8 further comprising using an interactive voice response system to disable performance of (b)–(d).

17. The method of claim 8 further comprising using a unified voice-mail system operative to receive messages for both the landline communication unit and the wireless communication unit.

18. A method for routing a call to a called party's landline or wireless communication unit, the method comprising:

(a) with a signal switching point (SSP), receiving, from a calling party, a destination number different from destination numbers assigned to the called party's landline and wireless communication units;

(b) with the SSP, suspending the call and launching a query to a service control point (SCP);

(c) sending a location request from the SCP to a home location register (HLR) of a mobile switching center (MSC);

(d) sending a response from the HLR to the SCP;

(e) if the response comprises a routing address of the called party's wireless communication unit and does not indicate that the wireless communication unit is inactive:

(e1) sending a forward call command from the SCP to the SSP;

(e2) forwarding the call from the SSP to the MSC; and (e3) routing the call through the MSC to the called party's wireless communication unit; and (f) if the response indicates that the called party's wireless communication unit is not registered with the HLR or is inactive:

(f1) sending a message from the SCP to the SSP authorizing termination to the called party's landline communication unit; and (f2) routing the call through the SSP to the called party's landline communication unit.

19. The invention of claim 18, wherein a forward call command is sent from the SCP to the SSP in act (e1) only if the called party's wireless communication unit is not busy.

20. The invention of claim, 18 further comprising:

if the called party's wireless communication unit is busy, routing the call to a unified voice-mail system operative to receive messages for both the called party's landline communication unit and the called party's wireless communication unit.

* * * * *